United States Patent [19]

Grant

[11] Patent Number: 4,920,646
[45] Date of Patent: May 1, 1990

[54] REPLACEABLE ADJUSTMENT MECHANISM

[76] Inventor: Jerry L. Grant, 14744 Washington Ave. #306, San Leandro, Calif. 94578

[21] Appl. No.: 177,626

[22] Filed: Apr. 5, 1988

[51] Int. Cl.⁵ .............................................. B26B 1/08
[52] U.S. Cl. ...................................... 30/162; 30/164; 30/335
[58] Field of Search .................. 30/162, 164, 335; 24/90.5, 104, 106, 543

[56] References Cited

U.S. PATENT DOCUMENTS

| | | | |
|---|---|---|---|
| 3,107,426 | 10/1963 | Robinson, Jr. | 30/162 |
| 3,741,592 | 6/1973 | Muncy | 24/261 R |
| 3,888,002 | 6/1975 | Graham | 30/162 |
| 4,089,112 | 5/1978 | Richards | 30/162 |

Primary Examiner—Frank T. Yost
Assistant Examiner—Rinaldi Rada
Attorney, Agent, or Firm—Flehr, Hohbach, Test, Albritton & Herbert

[57] ABSTRACT

A replaceable adjustment mechanism comprising an adjustment member and a clip means is described which is substantially rigidly mountable in a bore in a receiving structure. The shank of the adjustment member includes a reduced perimeter portion and a further reduced perimeter portion, and the clip means includes two resilient arms defining an access opening and an inner recess having dimensions corresponding to the dimensions of the further reduced perimeter shank portion. The replaceable adjustment mechanism is particularly suitable for use with a retractable blade utility knife.

5 Claims, 2 Drawing Sheets

REPLACEABLE ADJUSTMENT MECHANISM

TECHNICAL FIELD

The present invention relates generally to a replaceable adjustment mechanism substantially rigidly mountable on a receiving structure, and relates more specifically to a replaceable adjustment mechanism rigidly mountable on resilient blade carriers such as are commonly employed in retractable blade utility knives.

BACKGROUND ART

A conventional retractable blade utility knife and its adjustment mechanism is illustrated in FIG. 1. Utility knife 10 comprises a pair of mating housing components 12 which are fastenable together to form a generally hollow interior space and an exterior surface which is contoured to facilitate grasping of the handle. Generally right-angled rails 15 are formed in the housing components to permit sliding of blade carrier 14 for adjustment of blade 16 between a retracted safety position and one or more exposed cutting positions. Blade carrier 14 includes resilient arm member 18 having lateral crosspiece 20 at its terminal end. Lateral crosspiece 20 is engageable in one of a plurality of recesses 22 provided in the housing components to hold the blade in one of a plurality of positions. Adjustment member 24 includes manual interface button 26 connected to shank 28, which is rigidly mounted on resilient arm member 18 of the blade carrier.

As shown more clearly in the enlarged view of FIG. 2, shaft 28 of the adjustment member has a narrower tab 30 which is received through a mating bore in resilient arm member 18 of the blade carrier. During assembly of the utility knife, after tab 30 has been passed through the bore, its bottom surface is stamped or otherwise splayed or enlarged to rigidly mount adjustment member 24 on resilient arm member 18.

Adjustment of blade carrier 14 and blade 16 between a retracted safety position and one or more exposed cutting positions is achieved by exerting a downward force on adjustment member 24 to disengage lateral crosspiece 20 from one of the recesses 22 and sliding adjustment member 24 to position lateral crosspiece 20 in another of the recesses. When the downward force on the adjustment member is released, the lateral crosspiece is engaged in another of the recesses. In this fashion, adjustment of blade 16 to a variety of positions is made possible by depressing, sliding and releasing the adjustment member mounted on the blade carrier. Many utility knives of this general type are known in the art, and various improvements have been made thereon. Some exemplary retractable blade utility knives and improvements are taught in U.S. Pat. Nos. 3,107,426 and 4,586,256, which are assigned to The Stanley Works.

Although prior art utility knives provide generally satisfactory performance in most respects, one important disadvantage is that the adjustment mechanism frequently breaks off from the resilient arm member of the blade carrier. With each adjustment of the blade from a retracted to a working position and vice versa, substantial forces are exerted on the adjustment member and the resilient arm member of the blade carrier. These forces create large stresses at the rigid attachment of the adjustment member to the blade carrier and, over prolonged periods of use, the adjustment member may crack or break and become detached from the blade carrier. With utility knives of the type described above, no provision is made for replacement of the adjustment mechanism and the entire utility knife must be discarded and replaced when the adjustment member becomes detached from the blade carrier or breaks. Since utility knives are commonly used in many industries, the costs involved in replacing utility knives are very large.

Accordingly, it is an objective of the present invention to provide a replaceable adjustment mechanism which is rigidly mountable in a bore of a receiving structure.

It is another objective of the present invention to provide a replaceable adjustment mechanism which is substantially rigidly mountable on the blade carrier of a retractable blade utility knife or the like to extend the useful operating life of the utility knife.

It is yet another objective of the present invention to provide an improved retractable blade utility knife have a replaceable adjustment mechanism to extend the useful operating life of the utility knife.

DISCLOSURE OF THE INVENTION

The replaceable adjustment mechanism of the present invention includes an adjustment member having a modified shank, and a clip member for substantially rigidly mounting the shank of the adjustment member on a receiving structure. The replaceable adjustment mechanism of the present invention is mountable on any receiving structure having a suitably sized bore simply by passing the terminal end of the adjustment member shank portion through the bore in the receiving structure and engaging the clip member in a groove in the shank located immediately adjacent the receiving structure. In this fashion, the adjustment member may be replaced if it breaks or becomes disengaged from the receiving structure. The replaceable adjustment mechanism of the present invention is particularly suitable for use with a retractable blade utility knife having an adjustment mechanism rigidly mounted on a resilient arm member of the blade carrier.

BRIEF DESCRIPTION OF THE DRAWINGS

Further features of the invention will be apparent from the following more detailed description of the invention read in conjunction with the following drawings, in which.

BEST MODE OF CARRYING OUT THE INVENTION

Figure 3:
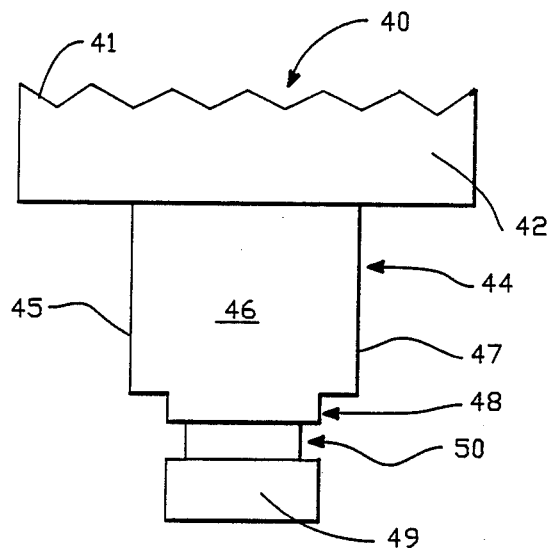
FIG. 3 shows an enlarged side elevational view of the replaceable adjustment member of the present invention.
Figure 4:
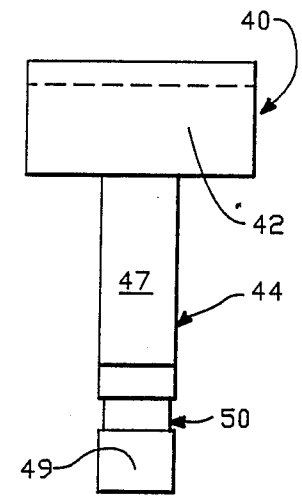
FIG. 4 shows an enlarged end elevation view of the replaceable adjustment member shown in FIG. 3.

As shown in FIGS. 3 and 4, adjustment member 40 of the present invention includes manual interface button 42, preferably having a serrated or knurled upper surface 41. The manual interface button is attached to shank 44 having substantially rectangular portion 46 projecting generally centrally from the lower surface of manual interface button 42, and having lateral edges 45 and 47. Substantially rectangular portion 46 terminates in a reduced perimeter portion of the shank defined by notches 48, which are preferably generally right-angled and displaced inwardly from lateral edges 45 and 47. The dimensions of notches 48 and the reduced perimeter of the shank at notches 48 correspond to the dimensions of the bore in the receiving structure.

Immediately adjacent notches 48, groove 50 provides a further reduced perimeter portion of the shank. According to a preferred embodiment illustrated in FIGS. 3 and 4, notches 48 are displaced inwardly from lateral edges 45 and 47 to provide a reduced perimeter portion at the lateral edges only, while groove 50 is continuous, that is, groove 50 is displaced inwardly both from lateral edges 45 and 47, and from the faces of rectangular portion 46. Shank 44 preferably terminates in terminal end portion 49 having a perimeter larger than the perimeter of groove 50. The perimeter of terminal end portion 49 preferably corresponds approximately to the perimeter of shank 44 at its reduced perimeter portion defined by notches 48, but end portion 49 may be larger if it is desired to provide greater holding forces.

Figure 1:
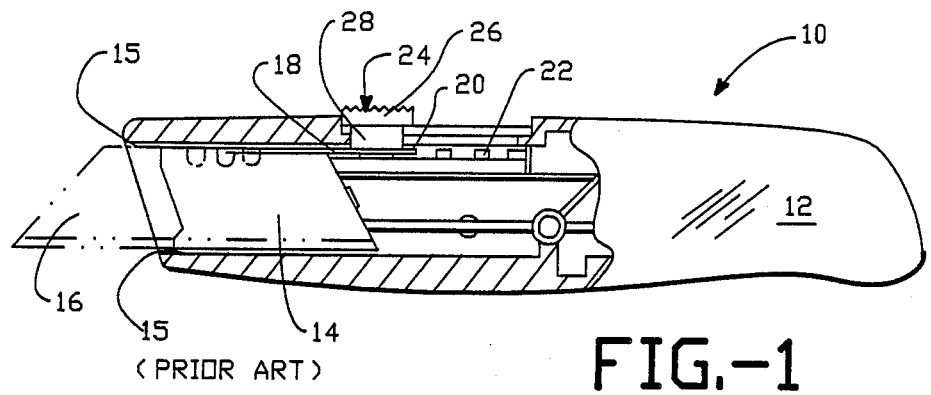
FIG. 1 shows a side elevational view of a prior art retractable blade utility knife partly broken away and partly in section, with a blade in a cutting position indicated by broken lines.
Figure 2:
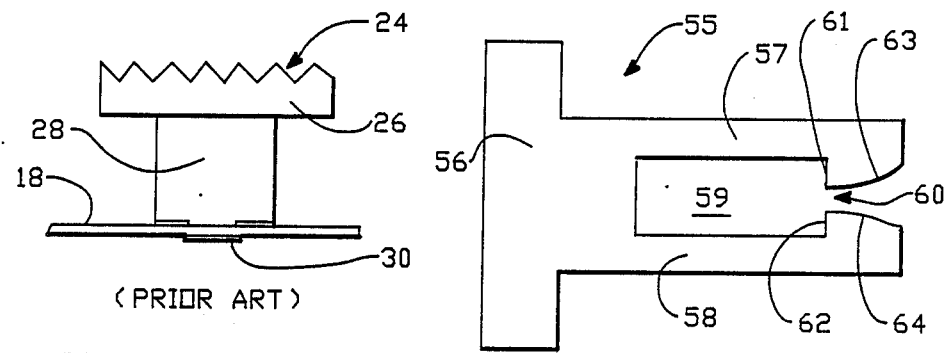
FIG. 2 shows an enlarged side elevational view of the prior art slidable adjustment mechanism for a utility knife mounted on the blade carrier.
Figure 5:
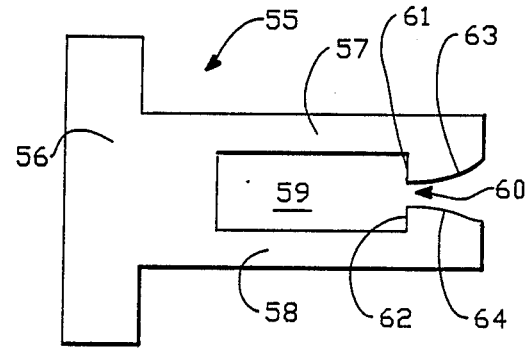
FIG. 5 shows an enlarged top view of the clip member for mounting the replaceable adjustment member shown in FIGS. 3 and 4 on a receiving structure.

Clip means 55 for substantially rigidly mounting adjustment member 40 on a receiving structure is shown in FIG. 5. The outer contour of clip means 55 preferably corresponds generally to the outer contour of the receiving structure. Clip means 55 comprises two opposed, resilient arms 57 and 58 defining inner recess 59. The dimensions of inner recess 59 correspond to the dimensions of the further reduced perimeter portion of shank 44 defined by groove 50. Resilient arms 57 and 58 are joined to a structure such as lateral crosspiece 56 at one end, which preferably corresponds to the contour of the receiving structure. Resilient arms 57 and 58 terminate in opposed retaining catches 61 and 62 at the opposite end, with opposed surfaces 63 and 64 adjacent retaining catches 61 and 62 defining access opening 60. Opposed surfaces 63 and 64 are preferably arcuate, as shown in FIG. 5, or angled, to facilitate engagement of the clip means on shank 44 at groove 50.

Figure 6:
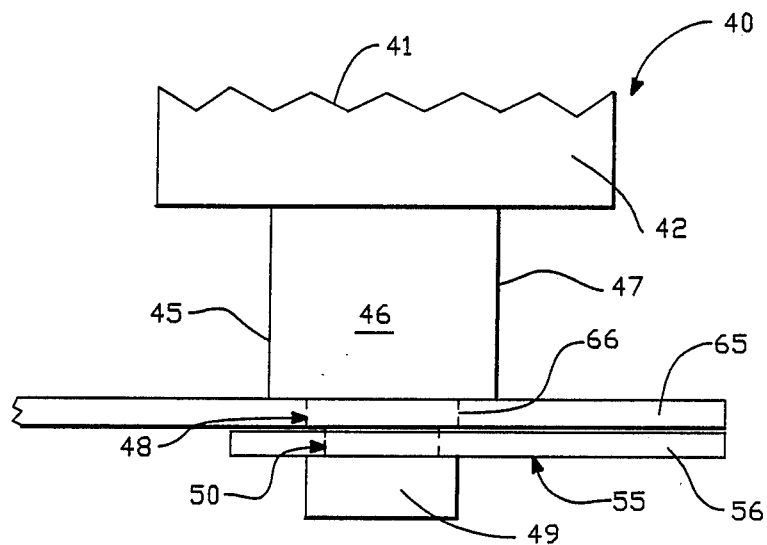
FIG. 6 shows an enlarged side elevational view of the replaceable adjustment member of the present invention mounted on a receiving structure.
Figure 7:
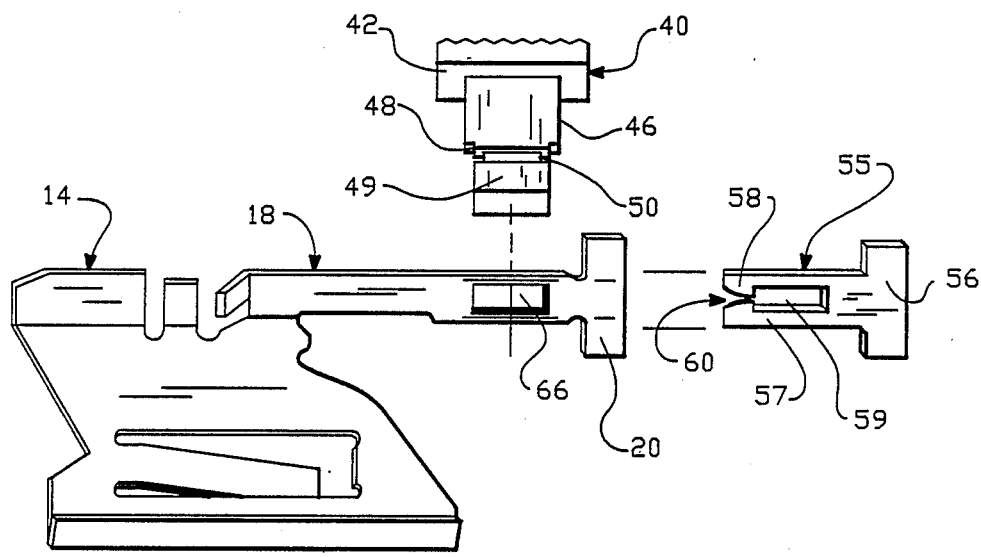
FIG. 7 shows an exploded perspective view of the replaceable adjustment mechanism of the present invention rigidly mountable on a blade carrier of a retractable blade utility knife.

FIGS. 6 and 7 illustrate engagement of adjustment member 40 and clip means 55 of the present invention on receiving structure 65 having receiving bore 66, such as resilient arm member 18 of blade carrier 14 of a retractable blade utility knife. The dimension of the reduced perimeter portion of shank 44 at notches 48 corresponds to the dimension of receiving bore 66 in the receiving structure, so that the shank is rigidly mountable on the receiving structure. Clip means 55 is engageable in groove 50 of the shank immediately below the receiving structure.

As described previously, the dimensions of inner recess 59 defined by resilient arms 57 and 58 of the clip means correspond to the dimensions the further reduced perimeter portion of the shank defined by groove 50. Furthermore, the thickness of the reduced perimeter portion of shank 44 at notches 48 corresponds to the thickness of the receiving structure at the receiving bore, and the thickness of the further reduced perimeter portion of shank 44 at groove 50 corresponds to the thickness of resilient arms 57 and 58 of the clip means. According to this preferred embodiment, replaceable adjustment member 40 is substantially rigidly mountable on a receiving structure with clip means 55 abutting the lower surface of the receiving structure.

Installation of the replaceable adjustment mechanism of the present invention on a receiving structure may be accomplished quickly and easily by a consumer having no specialized mechanical skills. Shank 44 of the adjustment member is inserted through bore 66 of receiving structure until the reduced perimeter portion of the shank at notches 48 is retained in bore 66. Clip means 55 may then be slidingly engaged on the further reduced perimeter portion of shank 44 at groove 50 by sliding opposed surfaces 63 and 64 along the groove until retaining catches 61 and 62 engage on the further reduced perimeter portion of the shank, so that groove 50 is securely engaged in inner recess 59 of the clip means. In this fashion, adjustment member 40 is rigidly mountable on a receiving structure so that forces exerted on manual interface button 42 will be translated to the receiving structure.

Adjustment member 40 may comprise any rigid material, and preferably comprises a rigid metallic material such as brass, cast aluminum, or the like, or a rigid plastic material. Clip means 55 preferably comprises a somewhat resilient metallic material, such as spring steel, or the like, or a somewhat resilient plastic material.

Although the replaceable adjustment mechanism of the present invention is particularly suitable for use with retractable blade utility knives, and preferred embodiments of the present invention have been described with reference to utility knives, it will be appreciated by those skilled in the art that the present invention may be adapted for use in a variety of other applications. The dimensions and configurations of the adjustment member and the clip means may be modified for mounting in suitably arranged bores on a variety of receiving structures. The basic features of the adjustment member, including the reduced perimeter portion at notches 48 and the further reduced perimeter portion at groove 50, and the basic features of the clip means, including resilient arms 57 and 58 defining an inner recess and an access opening, may be adapted for use with a wide variety of receiving structures.

What is claimed is:

1. A retractable blade utility knife having a replaceable adjustment mechanism, comprising:
   a pair of mating housing components fastenable together to form a generally hollow interior space and an exterior surface which is contoured to facilitate grasping of said exterior surface;
   a blade carrier and a cutting blade mountable thereon, said blade carrier adjustable between a retracted safety position and at least one exposed cutting position, and said blade carrier having a bore for receiving an adjustment mechanism; and
   a replaceable adjustment mechanism including an adjustment member having a manual interface button fastened to a shank mounted in said bore in said blade carrier, and a clip means mounted on said shank and abutting the surface of said blade carrier wherein said shank has a reduced perimeter portion defined by notches and a further reduced perimeter portion defined by a groove, and said clip means has two opposed resilient arms defining an inner recess and an access opening, said inner recess having dimensions corresponding to said further reduced perimeter portion of said adjustment member.

2. A retractable blade utility knife having a replaceable adjustment mechanism, comprising:
 a pair of mating housing components fastenable together to form a generally hollow interior space and an exterior surface which is contoured to facilitate grasping of said exterior surface;
 a blade carrier and a cutting blade mountable thereon, said blade carrier adjustable between a retracted safety position and at least one exposed cutting position, and said blade carrier having a bore for receiving an adjustment mechanism; and
 a replaceable adjustment mechanism including an adjustment member having a manual interface button fastened to a shank mounted in said in said bore in said blade carrier, and a clip means mounted on said shank and abutting the surface of said blade carrier wherein said shank has a reduced perimeter portion defined by notches and a further reduced perimeter portion defined by a groove, and said clip means has two opposed resilient arms defining an inner recess and an access opening, said inner recess having dimensions corresponding to said further reduced perimeter portion of said adjustment member, wherein the outer contour of said clip means corresponds generally to the outer contour of the receiving structure.

3. A retractable blade utility knife having a replaceable adjustment mechanism, comprising:
 a pair of mating housing components fastenable together to form a generally hollow interior space and an exterior surface which is contoured to facilitate grasping of said exterior surface;
 a blade carrier and a cutting blade mountable thereon, said blade carrier adjustable between a retracted safety position and at least one exposed cutting position, and said blade carrier having a bore for receiving an adjustment mechanism; and
 a replaceable adjustment mechanism including an adjustment member having a manual interface button fastened to a shank mounted in said bore in said blade carrier, and a clip means mounted on said shank and abutting the surface of said blade carrier wherein said shank has a reduced perimeter portion defined by notches and a further reduced perimeter portion defined by a groove, and said clip means has two opposed resilient arms defining an inner recess and an access opening, said inner recess having dimensions corresponding to said further reduced perimeter portion of said adjustment member, wherein the outer contour of said clip means corresponds generally to the outer contour of the receiving structure, wherein the thickness of said reduced perimeter portion of said shank at said notches corresponds to the thickness of the receiving structure, and the thickness of the receiving structure, and the thickness of said further reduced portion of said shank at said groove corresponds to the thickness of said resilient arms of said clip means.

4. A retractable blade utility knife having a replaceable adjustment mechanism, comprising:
 a pair of mating housing components fastenable together to form a generally hollow interior space and an exterior surface which is contoured to facilitate grasping of said exterior surface;
 a blade carrier and a cutting blade mountable thereon, said blade carrier adjustable between a retracted safety position and at least one exposed cutting position, and said blade carrier having a bore for receiving an adjustment mechanism; and
 a replaceable adjustment mechanism including an adjustment member having a manual interface button fastened to a shank mounted in said bore in said blade carrier, and a clip means mounted on said shank and abutting the surface of said blade carrier wherein said shank has a reduced perimeter portion defined by notches and a further reduced perimeter portion defined by a groove, and said clip means has two opposed resilient arms defining an inner recess and an access opening, said inner recess having dimensions corresponding to said further reduced perimeter portion of said adjustment member, wherein the outer contour of said clip means corresponds generally to the outer contour of the receiving structure, wherein the thickness of said reduced perimeter portion of said shank at said notches corresponds to the thickness of the receiving structure, and the thickness of said further reduced portion of said shank at said groove corresponds to the thickness of said resilient arms of said clip means, wherein said clip means abuts the lower surface of the receiving structure.

5. In a retractable blade utility knife of the type having a pair of mating housing components fastenable together to form a generally hollow interior space and an exterior surface which is contoured to facilitate grasping of said exterior surface, a blade carrier and a cutting blade mountable thereon, said blade carrier adjustable between a retracted safety position and at least one exposed cutting position, and said blade carrier having a bore, and a manually operable adjustment mechanism having a manual interface button fastened to a shank mounted in said bore in said blade carrier, the improvement wherein said manually operable adjustment mechanism is replaceable, the further improvement wherein said shank has a reduced perimeter portion defined by notches and a further reduced perimeter portion defined by a groove, and a clip means mounted on said shank has two opposed resilient arms defining an inner recess and an access opening, said inner recess having dimensions corresponding to said further reduced perimeter portion of said adjustment member.

* * * * *